(12) United States Patent
Mottin et al.

(10) Patent No.: US 10,689,989 B2
(45) Date of Patent: Jun. 23, 2020

(54) METHOD FOR FRICTION-WELDING A BLADE TO A TURBOMACHINE VANE, INCLUDING A SURFACING PROCESS

(71) Applicant: Safran Aircraft Engines, Paris (FR)

(72) Inventors: Jean-Baptiste Mottin, Moissy Cramayel (FR); Marc Jacky Vassault, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 391 days.

(21) Appl. No.: 15/526,527

(22) PCT Filed: Nov. 4, 2015

(86) PCT No.: PCT/FR2015/052983
§ 371 (c)(1),
(2) Date: May 12, 2017

(87) PCT Pub. No.: WO2016/075391
PCT Pub. Date: May 19, 2016

(65) Prior Publication Data
US 2017/0328225 A1    Nov. 16, 2017

(30) Foreign Application Priority Data

Nov. 14, 2014   (FR) ..................................... 14 61037

(51) Int. Cl.
*F01D 5/30*    (2006.01)
*B23K 20/12*    (2006.01)
(Continued)

(52) U.S. Cl.
CPC ........ *F01D 5/3061* (2013.01); *B23K 20/1205* (2013.01); *B23K 20/129* (2013.01);
(Continued)

(58) Field of Classification Search
CPC ..... F01D 5/3061; F01D 5/005; B23K 26/342; B23K 20/129; B23K 20/1205;
(Continued)

(56) References Cited

U.S. PATENT DOCUMENTS

| 9,869,189 B2 | 1/2018 | Mottin et al. |
| 2007/0071608 A1 | 3/2007 | Trewiler et al. |
| 2012/0148413 A1 | 6/2012 | Richter et al. |

FOREIGN PATENT DOCUMENTS

| DE | 10 2004 043 746 A1 | 3/2006 |
| DE | 10 2009 033 835 A1 | 1/2011 |

(Continued)

OTHER PUBLICATIONS

JP 2009-039746-A Machine Translation Feb. 2009 (Year: 2009).*

*Primary Examiner* — Lee A Holly
(74) *Attorney, Agent, or Firm* — Blank Rome LLP

(57) ABSTRACT

According to the invention, a blade is friction-welded to a rotor disk of a turbomachine, the disk comprising a projecting block having an outer surface to which the blade is to be welded. To this end: a surfacing process is carried out on at least a part of the periphery of the block, in the region of said outer surface; the outer surface of the block and the surfacing are machined in order to level same; and friction-welding is then carried out between the surfaced outer surface of the block and the blade.

7 Claims, 2 Drawing Sheets

(51) Int. Cl.
  *B23K 26/342* (2014.01)
  *B23K 101/00* (2006.01)
  *F01D 5/00* (2006.01)
  *B23K 103/08* (2006.01)
  *B23P 15/00* (2006.01)

(52) U.S. Cl.
  CPC ............ *B23K 26/342* (2015.10); *F01D 5/005* (2013.01); *B23K 2101/001* (2018.08); *B23K 2103/08* (2018.08); *B23P 15/006* (2013.01); *F05D 2230/239* (2013.01)

(58) Field of Classification Search
  CPC .......... B23K 2103/08; B23K 2101/001; F05D 2230/006; B23P 6/005
  See application file for complete search history.

(56) References Cited

FOREIGN PATENT DOCUMENTS

| | | |
|---|---|---|
| DE | 10 2013 226 221 A1 | 6/2015 |
| JP | 2009-39746 A | 2/2009 |
| JP | 2009039746 A  * | 2/2009 |
| WO | WO 2006/026962 A1 | 3/2006 |
| WO | WO 2014/083275 A1 | 6/2014 |

* cited by examiner

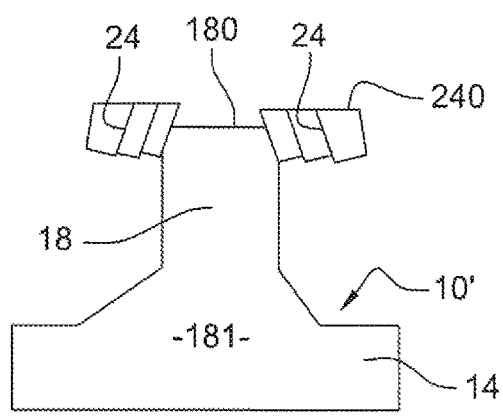
Fig. 3
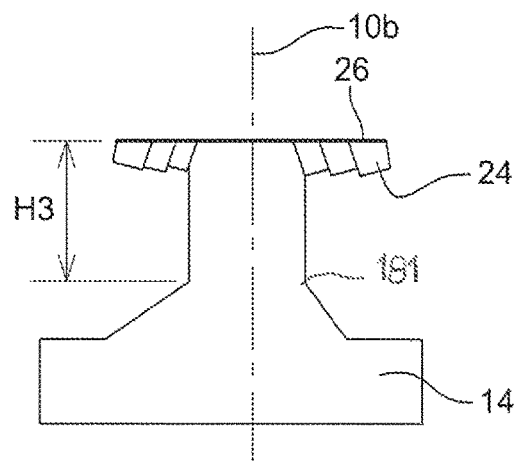
Fig. 4
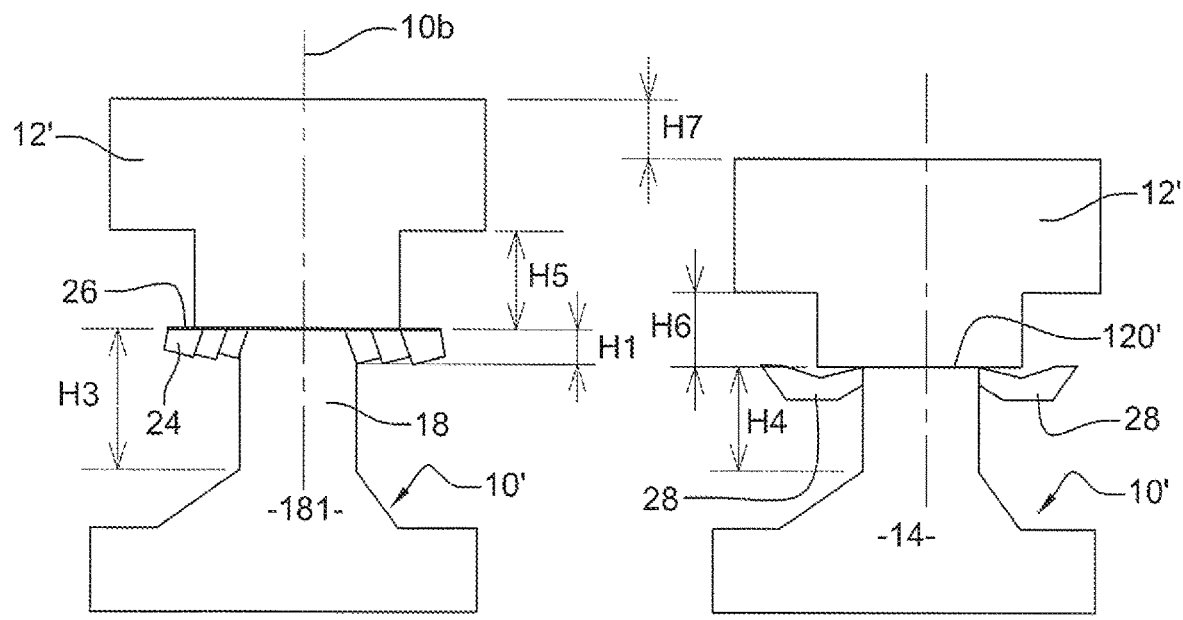
Fig. 5
Fig. 6

METHOD FOR FRICTION-WELDING A BLADE TO A TURBOMACHINE VANE, INCLUDING A SURFACING PROCESS

BACKGROUND OF THE INVENTION

1. Field of the Invention

The present invention relates to a method for friction-welding a blade to a rotor disk of a turbomachine such as an aircraft turbojet engine or a turboprop engine.

2. Description of the Related Art

A blisk (DAM) of a turbomachine is a rotor disk, the outer periphery of which comprises an annular row of substantially radial blades, which are integral with the disk. Such type of disk can be obtained by friction-welding blades to a disk provided with projecting blocks, with the radially internal end of each blade being welded to a block of the disk.

When at least one blade of the disk is damaged and has to be replaced, it is removed, by machining for instance, so that a block of material (corresponding to the radially internal end part of the machined blade) remains at the periphery of the disk for welding a new blade.

The previous application WO 2014/083275 provides, for repairing a blisk, to use friction-welding the blade onto the rotor disk, with the disk comprising (at the outer periphery) a projecting block on the outer surface of which the blade is to be welded.

The method more particularly provides for:
a step consisting in mounting stops on the block leading and trailing edges, with each stop comprising a recess wherein the block leading or trailing edge is engaged and the shape of which substantially matches that of such edge,
prior to friction-welding, making the stops integral with the block by welding, and
during friction-welding, the weld beads between the stops and the block are at least partially ejected in material flashes which are formed around the connection zone between the blade and the block and which are intended to be removed or eliminated, by machining for instance.

However interesting, such technique shows its limits when a significant variation of the section between the main cross-section and the Leading Edge (BA) or the Trailing Edge (BF) occurs, specifically on the DAMs, which may result in height variations in a ratio over 15, or even over 18.

Besides, the thickness of the trailing edge and the leading edge on such parts may additionally be small (less than 2 mm, even 1.5 mm).

Because of the geometry of the parts, thermal issues may additionally be a critical point, since the welding pressure per unit of area is higher in BA and BF and generates heat-affected areas (ZAT) having a larger surface or volume.

Such factors may cause strain localized in BA and BF during friction-assembling.

The above-mentioned significant variation in section may also be the source of some heterogeneity in the microstructure of the welded assembly.

SUMMARY OF THE INVENTION

One aim of the present invention is at least to limit the above-identified disadvantages, or even to overcome same.

A solution is provided for this purpose:
surfacing (refilling with material) at least a part of the periphery of the block, in the region of said outer surface, and thus obtaining an enlarged welding surface (larger than said outer surface of the block),
machining the outer surface of said block and the surfacing, to put them at the same level, and
friction-welding the outer surface of the surfaced block and the blade.

In practice, the precision of the surfacing will a priori be essential to secure the final assembling with the desired metallurgy.

Machining will thus advantageously make it possible to secure flatness totally consistent with the requirements of the friction-welding method.

In this context, it is recommended that the step of machining should comprise the provision of a flatness of less than 0.5 mm and preferably of less than 0.1 mm between the outer surface of the block and the surfacing.

During friction-welding, the molten area connected with said surfacing (refilling), thus a part of the material added by the surfacing (refilling), will be expelled in a <<flash>>; as a matter of fact, the electric current, confined in strictly localized contact points, will cause repeated sparkling (flash) and the expulsion of molten metal. It is thus recommended that:
the block should be positioned on the disk in a predetermined direction, along a first height, after machining and prior to friction-welding, then along a second height, smaller than the first one, after friction-welding, and that the surfacing (refilling) should be performed along a height smaller than the difference in height between the first perpendicular height and the second height, in a direction to the outer surface of the block and/or parallel to said predetermined direction.

The height of the surfacing (refilled material) will thus be smaller than the value of the material consumed on the block side; and the presence of a waste from the molten area in the final assembly, which might cause the weakening the metallurgical bonding and non negligible mechanical reductions, will thus be avoided.

In order to minimize the size of the heat-affected area (ZAT, an area close to the connection area where the temper structure is more visible than anywhere else) and the residual constraints imparted by the surfacing process, the following will be preferred:
a fusion surfacing (refilling) by welding or laser,
and/or a surfacing (refilling) by CMT welding (short-circuit arc welding), or laser deposition welding.

In order to take the best account of the geometry of the block and of the blade to be welded thereon, specifically as regards the significant variation in section between the main cross-section and the Leading edge (BA) or the Trailing edge (BF), and the thickness of such trailing and leading edges, which may be less than 2 mm, even less than 1.5 mm, it will a priori be preferable for the step of welding to comprise a linear friction-welding.

Additionally, said enlarged welding surface (machined surfaces of the block and of the surfacing) will advantageously be taken advantage of to position the blade against said enlarged welding surface, between the steps of machining and welding, with such positioning being carried out via the interface of a preform of the blade which will partially overlap the machined surfacing.

In addition to the welding method above, the invention also relates to a blisk for a turbomachine, produced or repaired using said method, with all or part of the characteristics thereof.

BRIEF DESCRIPTION OF THE DRAWINGS

Such invention will be better understood and other details, characteristics and advantages of the invention will appear upon reading the following description given as a non restrictive example and referring to the appended drawings, wherein:

FIGS. 3 to 6 are partial schematic views according to the invention, in cross-section along the line of one of the blocks of FIG. 2, where FIG. 3 illustrates the situation upon completion of the surfacing process, FIG. 4 illustrates the situation upon completion of the machining of the outer surface of said block and of the surfacing, to level same, FIG. 5 illustrates the situation at the beginning of the friction-welding, after a preform of the blade to be positioned has been added onto the block, and FIG. 6 illustrates the situation when reaching the end of such welding, whereas sparkling still expels material.

DETAILED DESCRIPTION OF THE PREFERRED EMBODIMENTS

Figure 1:
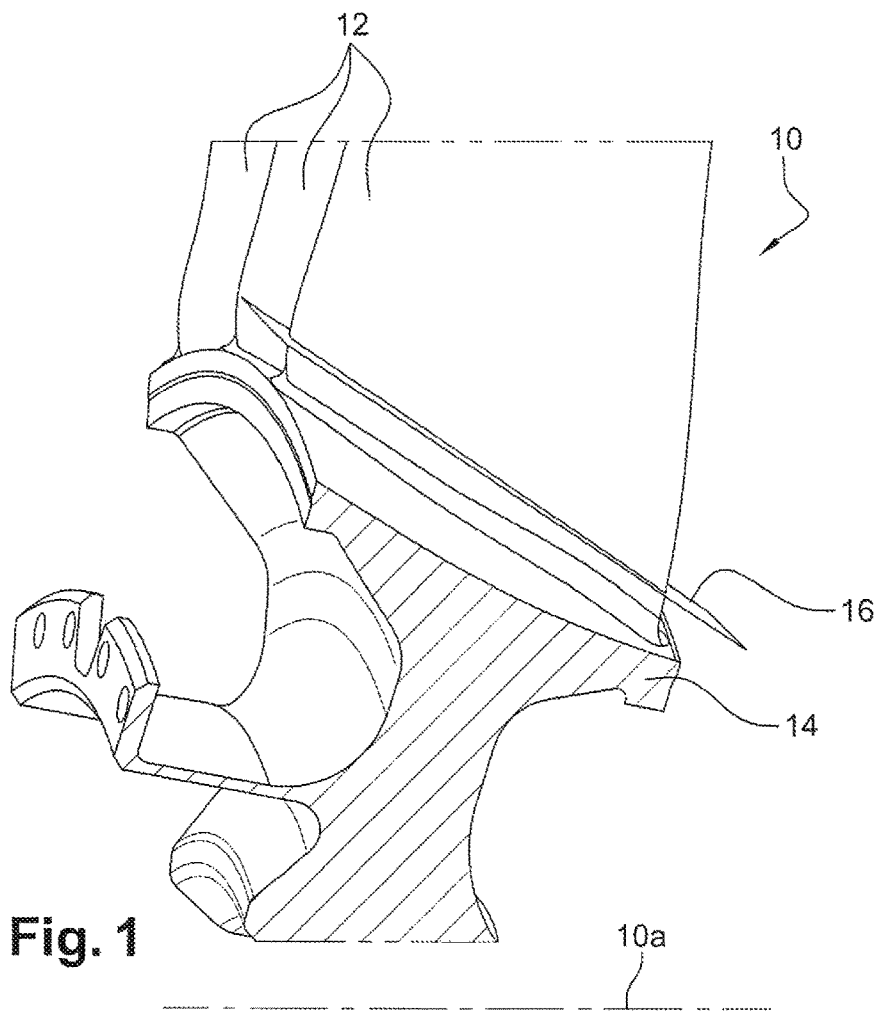
FIG. 1 is a partial schematic view in perspective of a blisk of a turbomachine.

Although the invention generally applies to the manufacturing, specifically the repairing, of blades using an additional process associated with a friction-welding, FIG. 1 thus shows a preferred application of the solution proposed for repairing a blisk 10 (DAM), considering what has been explained above.

A part of a blisk 10 (DAM) of a turbomachine is thus illustrated, which is to be so mounted as to rotate about an axis of rotation 10a. Thus <<axial>> means (substantially) oriented along, or parallel to the axis 10a, and <<radial>> means (substantially) oriented perpendicularly to or radially relative to the axis 10a. Besides, is considered as radially internal everything closer to the axis 10a than what is radially external thereto.

The disk 10 carries an annular row of substantially radial vanes or blades 12 which are integral (made in one piece) with the disk. The blades 12 are connected by their radially inner ends to an annular platform 14 which extends at the outer periphery of the disk.

If vanes or blades 12 are damaged, these can be removed by machining, to be replaced. Reference 16 refers to a cutting plane of a blade 12 intended to be replaced. The cutting plane, which defines the (radially) outer surface 180, extends substantially parallel to and at a distance from the annular outer surface of the platform 14.

The distance between the platform 14 and the cutting plane 16 is so determined that a block 18 of material (corresponding to the radially inner part of the blade which extends between the platform 14 and the cutting plane 16) remains on the platform 14 to be used as a support for the friction-welded fastening of a new vane of the blade.

Figure 2:
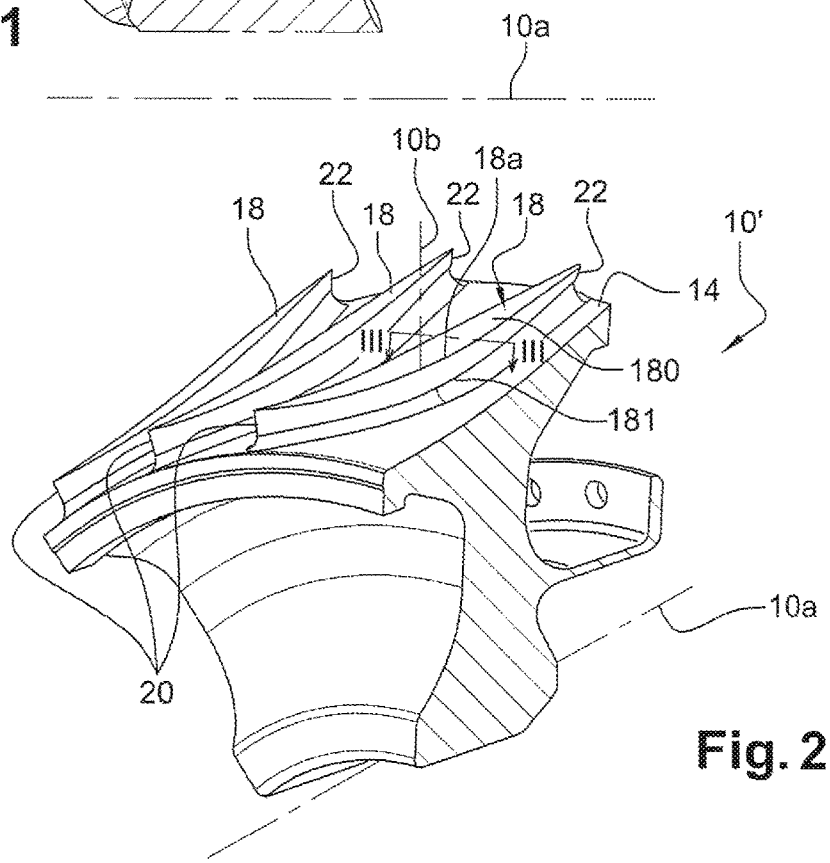
FIG. 2 is partial schematic view in perspective of the disk of FIG. 1 after machining (cutting) some of the blades thereof, with a view to replacing same.

FIG. 2 shows a rotor disk 10' which carries, close to its periphery an annular row of blocks 18 of the above-mentioned type. Each block 18 thus projects from the platform 14, at the outer periphery thereof. And the bond/cutting plane 16 is positioned radially beyond the disk blade/platform blending radius.

The disk 10' can be obtained by machining and removing the blades of a blisk 10 in order to repair such disk, as explained above. As an alternative solution, the disk 10' could be directly obtained, as cast for instance, for manufacturing a blisk. In this case, the blocks would be produced when manufacturing the disk and would each be intended to receive a vane of a blade.

As can be seen in FIG. 2, each block has a leading edge 20 and a trailing edge 22 connected together by a front side and a back side.

A blade (not shown) is to be fastened to each block 18 of the disk by potentially linear or orbital friction-welding.

In order to prevent the problems mentioned above, connected to the significant variation of the transverse dimension of the block 18 between the cross-section and the leading 20 and trailing 22 edges thereof, by avoiding using the stops mentioned in WO 2014/083275, the present invention provides here for a surfacing of the block 18, at the cutting plane 16, after the corresponding blade has been removed.

FIG. 3 thus schematically shows that the illustrated block 18 of the disk 10' has been surfaced/refilled with material, in 24, on at least a part of the periphery 18a of the block, in the region of the (radially) outer surface 180 of the block.

The disk 10', and specifically the block have been prepared beforehand; the area 180 to be welded has been sand-blasted and degreased, for surfacing purposes.

The material added by the surfacing process is the same metal, or alloy, as that of the block, or a material physically and chemically compatible therewith so that both parts can be welded together.

During this step, the surfacing/refilled material 24 results in the outer surface 180 having an uneven surface condition, with excessive thickness where the surfacing has been performed, i.e. specifically on the periphery 18a of the area cut in the block, as illustrated in FIG. 3.

The outer surface 180 of the block and the surfacing 24 will then be machined to be leveled, as schematically shown in FIG. 4. This results in a larger welding surface 26, thus enlarged with respect to the surface 180 of the block alone.

In order to equalize the stress applied between the two elements (the block and the blade) during the friction-welding and to homogenize the temperature gradients in the parts, it is recommended that the step of machining should comprise the provision of flatness of the (machined) welding surface 26 of less than 0.5 mm, and preferably of less than 0.1 mm, thus between the initial outer surface 26 of the block and the initial outer surface 240 of the surfacing (refer to FIG. 3).

Machining may include grinding or provide for the utilization of a cutting tool.

The figures show that the height H1 of the surfacing 24 will be smaller than the height, so-called H2, of the material of the block 18 consumed during the friction-welding, with H2=H3−H4.

Thus:
if it is considered that, prior to welding, but after machining (FIG. 4), the block 18 radially reaches, on the platform 14 of the disk, (the axis 10b in FIGS. 4, 5) along a first height H3 (up to the surface 26),
then along a second height H4 (up to the interface with the replacement blade 12'), smaller than the height H3, after the friction-welding (FIG. 6), then, in a direction perpendicular to the outer surface 180 of the block and/or parallel to said radial direction 10$b$, the surfacing will be performed, preferably along a height H1 smaller than the difference in height H3–H4 (=H2).

To perform such surfacing along such height H2 which takes the height H3, and the height H4 into account, the results of prior tests or experiments, performed during a development phase and recorded on charts or in a computer memory can be used.

It should be noted that the two reference bases will be similarly defined for the height H3 and the height H4, i.e. for instance the base of the considered block 18, from, and radially outwards beyond, the place where it is flared inwards in 181, for the connection thereof with the platform 14 of the disk.

The surfaced area 24 will make it possible to reinforce the finished part at the leading edge BA and the trailing edge BF and to homogenize the thickness of the area to be welded.

FIGS. 5, 6 show in H5 and H6 respectively the height, perpendicularly to the outer surface 180 and/or parallel to the radial direction 10$b$, along which the replacement blade 12' is positioned, typically on the radially internal part thereof from the interface 120' thereof with the surface 26 and a part of which will be consumed during the friction-welding. Besides, FIG. 6 shows in H7 the total height (H5+H6) of materials of the block and of the blade consumed during the friction-welding (perpendicularly to the outer surface 180 and/or parallel to the direction 10$b$).

Fusion welding or laser welding will be preferred for the surfacing.

In order to minimize the dimension, in volume, of the heat-affected areas (ZAT) (using surfacing and/or welding) and the residual constraints imparted by the surfacing process, processes of the CMT (Metal Inert Gas Cold Metal Transfer), or LMD (Laser Metal Deposition) types will thus be preferred.

As is known, CMT welding is a method for electric arc welding but, when compared to the MIG/MAG processes, the cutting edge is submitted to reciprocating movements. As a result, the material is transferred with a reduced (almost null) electric current, and the deposited material is <<colder>>. The CMT welding is preferably carried out using exclusively totally digital Inverter sources of current (with a frequency converter). This is a method for a short-circuit arc welding with release of drops of the feedwire.

The laser deposition technique is also known under different names, among which: Laser Metal Deposition (LMD), Direct Metal Deposition (DMD), Direct Laser Deposition (DLD), Laser Engineered Net Shaping (LENS), laser cladding, Laser Deposition welding and powder fusion welding. The method comprises using a laser beam used to form a fusion bath on a metallic substrate, wherein the powder is introduced. The powder melts, and forms a deposit adhering by fusion to the substrate.

Then when a suitable height H1 of the surfacing 24 (smaller than H2), and the expected flatness of the machined welding surface 26 have been defined, a new blade 12' will thus be positioned with its interface 120' against said (radially) outer surface 26, as schematically shown in FIG. 5.

Advantage can then be taken of the machined surfaces of the block and of the blade which created said enlarged welding surface 26, prior to the subsequent welding, to position the blade 12' against said enlarged welding surface, with such positioning being carried out via the interface of a preform of the blade which will partially overlap the machined surfacing (the machined surface thereof), as can be seen in FIG. 5.

Overlapping will at least laterally exist in width where the cut block is the widest (refer to the Figures). Typically, this may be the area at mid-length, or close thereto, as illustrated in FIG. 1 (section III-III).

The friction-welding of said two compatible elements can then begin.

Considering the shapes desired for the surfaces 180 and 26, it is recommended that such friction-welding should be linear, even though an orbital solution or any other solution is possible.

Among the advantages, savings on material, the possibility of using different materials or fibers between the blades and the (the platform of the) disk and the possibility of welding hollow blades can be noted.

The blocks 18 and the blades 12' can be made of Ti17.

During the step of welding, the blade 12' will still advantageously be a preform, a rough new blade, like the block schematically illustrated in FIGS. 5, 6. Both elements in contact will be assembled by friction at the mushy stage, which will thus enable an assembly without any mechanical reduction. The preform of the blade will thus be shaped, typically machined, only after welding, so that the blade is given its final shape.

FIG. 6 shows, in 28, that sparkling still expels some material, so that the height H4 and the height H6 are still reduced.

The molten area (ZF) connected with the surfacing will be expelled in a flash. And this is the reason why the height H1 will advantageously be smaller than the value of the material consumed on the block side (H2). If not so, a waste from the molten area ZF will be present in the final assembly, and will cause the weakening of the metallurgical bonding and result in potentially non negligible mechanical reductions.

It should also be noted that the heat-affected areas ZAT resulting from the operation of surfacing will be transformed during the operation of friction-welding. The large grains of the heat-affected areas ZAT will be refined and thus recover a size similar to the forged material.

As a conclusion, the welded parts are usually submitted to non destructive tests, heat-treatment operations, as well as machining phases so that the geometry of the welded part, i.e. the final shape of the blade can be restored. Shot-blasting can also be executed, if need be.

Eventually, a new rotor disk, here the expected blisk of the turbomachine, will thus be obtained.

The invention claimed is:

1. A method for friction-welding a blade to a rotor disk of a turbomachine, with the rotor disk comprising a projecting block having an outer surface to which the blade is to be welded, the method comprising the following steps:
 a) carrying out a surfacing process on at least a part of a periphery of the projecting block, in the region of said outer surface;
 b) machining the outer surface of the projecting block and of the surfacing, in order to put them at the same level so as to obtain an enlarged welding surface;
 c) friction-welding is then carried out between the enlarged surface and the blade;
 wherein the projecting block is positioned on the rotor disk in a predetermined direction, along a first height, after machining and prior to friction-welding, then along a second height, smaller than the first height, after friction-welding; and wherein, in at least one of a direction perpendicular to the outer surface of the projecting block and a direction parallel to said predetermined direction, the surfacing process is performed along a height smaller than the difference between the first height and the second height.

2. The method according to claim 1, wherein the step of machining comprises making a flatness of less than 0.5 mm between the outer surface of the projecting block and the surface surfaced at a step a).

3. The method according to claim 1, wherein the step of surfacing comprises a fusion surfacing by one of a welding and a laser.

4. The method according to claim 1, wherein the step a) of surfacing comprises surfacing by one of CMT and laser deposition welding.

5. The method according to claim 1, wherein, between the steps of machining and the step of friction-welding, and via an interface of a preform of the blade which overlaps a portion of the enlarged welding surface, the blade is positioned against said enlarged welding surface.

6. The method according to claim 1, wherein the step of machining comprises making a flatness of less than 0.1 mm between the outer surface of the block and the surfaced surface.

7. A method for friction-welding a blade to a rotor disk of a turbomachine, with the rotor disk comprising a projecting block having an outer surface to which the blade is to be welded, the method comprising the following steps:
   carrying out a surfacing process on at least a part of the periphery of the block, in the region of said outer surface, so as to obtain a surfaced outer surface;
   machining the outer surface of the projecting block and of the surfaced outer surface, in order to put them at the same level so as to obtain an enlarged welding surface; and
   friction-welding is then carried out between the enlarged welding surface and the blade,
   wherein the step of friction-welding comprises a linear friction-welding, and wherein between the step of machining and the step of friction-welding, and via an interface of a preform of the blade which intrudes on the machined outer surface, the blade is positioned against said enlarged welding surface.

* * * * *